United States Patent
Cuffaro (10) Patent No.: US 7,248,883 B2
(45) Date of Patent: *Jul. 24, 2007

(54) METHOD AND SYSTEM FOR DETERMINING THE SPEED AND POSITION OF A MOBILE UNIT

(75) Inventor: Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,238

(22) Filed: Oct. 28, 2005

(65) Prior Publication Data

US 2006/0052114 A1    Mar. 9, 2006

Related U.S. Application Data

(63) Continuation of application No. 10/330,637, filed on Dec. 27, 2002, now Pat. No. 7,123,924.

(60) Provisional application No. 60/392,413, filed on Jun. 28, 2002.

(51) Int. Cl.
*H04Q 7/20* (2006.01)
*H04M 1/00* (2006.01)
*H04B 1/38* (2006.01)
*H04B 15/00* (2006.01)

(52) U.S. Cl. .............. 455/456.1; 455/456.3; 455/456.5; 455/456.6; 455/561; 455/550.1; 455/63.4; 455/562.1

(58) Field of Classification Search .............. 340/426.2, 340/993, 825.49, 539.13, 426.19; 343/908, 343/893, 824, 782; 342/359–360, 385, 408; 242/422, 429; 455/456.1–456.3, 404.2, 456.5, 455/456.6, 13.3, 19, 25, 63.4, 82–83, 562.1, 455/575.5, 463, 514, 60, 517, 524–526, 550.1, 455/560–561, 440–441, 422.1, 569.2, 575.7, 455/575.9

See application file for complete search history.

(56) References Cited

U.S. PATENT DOCUMENTS

| | | | |
|---|---|---|---|
| 4,409,687 A | | 10/1983 | Berti et al. |
| 5,670,964 A | | 9/1997 | Dent et al. |
| 5,945,948 A | | 8/1999 | Buford et al. |
| 5,960,355 A | | 9/1999 | Ekman et al. |
| 6,061,337 A | | 5/2000 | Light et al. |
| 6,137,991 A | * | 10/2000 | Isaksson .................. 455/67.11 |

(Continued)

FOREIGN PATENT DOCUMENTS

| | | |
|---|---|---|
| JP | 11298945 | 10/1999 |
| JP | 411298945 | 10/1999 |
| JP | 02000078642 A * | 3/2000 |
| WO | 96/01531 | 1/1996 |
| WO | 96/42179 | 12/1996 |
| WO | 02/47421 | 6/2002 |

*Primary Examiner*—Meless Zewdu
(74) *Attorney, Agent, or Firm*—Volpe and Koenig, P.C.

(57) ABSTRACT

Apparatus and methods are disclosed for estimating the position and velocity of mobile wireless transmit/receive units (WTRUs) in a wireless communication system. Network stations use directional communication beams to divide service areas into sectors to provide communication services to the WTRUs. A WTRU saves pertinent information such as sector ID, received power and time of reception of the several received signals. The collected information is sent to the network, where it is used to estimate the WTRU's position, speed and direction of travel, which information can then be used to improve radio resource management.

17 Claims, 2 Drawing Sheets

U.S. PATENT DOCUMENTS

| | | |
|---|---|---|
| 6,148,198 A | 11/2000 | Anderson et al. |
| 6,195,046 B1 | 2/2001 | Gilhousen |
| 6,236,365 B1 | 5/2001 | LeBlanc et al. |
| 6,246,861 B1 | 6/2001 | Messier et al. |
| 6,321,083 B1 | 11/2001 | Vaara et al. |
| 6,639,554 B2 | 10/2003 | Kim et al. |
| 6,701,132 B1 | 3/2004 | Fukuzawa et al. |
| 6,801,511 B2 * | 10/2004 | Park ............................ 370/331 |
| 6,985,839 B1 * | 1/2006 | Motamedi et al. ........ 455/422.1 |
| 2002/0002066 A1 | 1/2002 | Pallonen |
| 2002/0009992 A1 * | 1/2002 | Jensen ........................ 455/422 |
| 2002/0052208 A1 | 5/2002 | Porcino |
| 2002/0149518 A1 | 10/2002 | Haataja et al. |
| 2002/0175854 A1 | 11/2002 | Shioda et al. |
| 2004/0127220 A1 * | 7/2004 | Proctor, Jr. .................. 455/442 |

* cited by examiner

METHOD AND SYSTEM FOR DETERMINING THE SPEED AND POSITION OF A MOBILE UNIT

CROSS REFERENCE TO RELATED APPLICATION

This application claims priority from U.S. Provisional Patent Application No. 60/392,413 filed on Jun. 28, 2002; and U.S. patent application Ser. No. 10/330,637, filed Dec. 27, 2002, now U.S. Pat. No. 7,123,924, which are incorporated by reference as if fully set forth.

BACKGROUND OF THE INVENTION

The present invention is directed to wireless communication systems. More particularly, the invention is related to a cellular system using a plurality of smart antennas for determining the speed and distance of a wireless transmit receive unit (WTRU).

In current wireless system deployments, the speed and position of WTRUs are determined using many different methods. For example, global positioning system (GPS) may be used for those WTRUs with GPS capability. Alternatively, the network may determine the speed and position using triangulation techniques. Each of these techniques generally have undesirable drawbacks. For example, the GPS affixes significant expense and complexity to a WTRU. A WTRU that is equipped with a GPS is basically a device with two receivers, one for interfacing with the cellular system and the second for the reception of the positioning satellites. The additional receiver increases the battery consumption and uses up valuable WTRU resources.

Another method for WTRU position determination employs triangulation techniques that require the use of additional primary stations and/or extra hardware in each primary station to support the triangulation.

It would desirable to provide an improved WTRU tracking mechanism which is able to effectively locate a WTRU when it is in communication with a primary station.

SUMMARY

The present invention comprises a method and system where a common channel (such as a beacon channel) is swept over a specified coverage area of a sectorized cell. An idle wireless transmit/receive unit (WTRU) saves pertinent information such as received power and time of reception of the last several readings of the common channel. On the WTRU's next access, the information is sent to the network to determine the WTRU's location, its direction of travel and a speed estimate which is valuable for radio resource management.

The communications system preferably includes a plurality of WTRUs and means to calculate a speed and distance of each of the plurality of WTRUs using stored information. Each WTRU preferably has a receiver that is configured to monitor a selected channel while in an idle state, a memory to store information regarding the selected channel and a transmitter to send the stored information from the WTRU at an appropriate time.

In one embodiment a wireless communication network in which communication services for WTRUs is provided by network stations that transmit wireless communication signals in directional beams such that beams are from time to time transmitted to each area serviced by the respective network station, each beam including beam identifying information. The network preferably includes at least one network station and at least one WTRU.

A preferred network station has a transmitter configured to transmit wireless communication signals in directional beams from a known location such that beams are from time to time transmitted to each area serviced by the network station, each beam including beam identifying information.

A preferred WTRU has a receiver configured to receive a plurality of network station transmitted directional beams, including beam identifying information for each of the received beams. The WTRU receiver is preferably configured to measure respective received signal strength for each of the plurality of beams received. The WTRU has an associated memory configured to store respective beam identifying information data with respective measured received signal strength data. The WTRU also preferably has a transmitter configured to transmit to the network station stored beam identifying information data and received signal strength data for the plurality of received beams. The memory and the transmitter of the WTRU is preferably configured to transmit sets of beam identifying information data and received signal strength data for a selected number, no less than three, of successively received beams. The beam identifying information data for each beam preferably includes a direction of the beam, a time the beam was sent and a transmit power of the beam.

A preferred network station also a receiver configured to receive sets of beam identifying information data and received signal strength data from WTRUs and an associated controller configured to estimate the position, speed and direction of movement of a particular WTRU using beam identifying information data and received signal strength data for a plurality, preferably at least three, of received beams received from the particular WTRU in a data set. The network station controller is preferably configured to calculate a signal pathloss from the beam identifying information data and received signal strength data, for each of the plurality of beams; estimate, from a calculated pathloss, a distance from the network station known transmission location to the WTRU for each of the plurality of beams; estimate, from a network station known transmission location and respective estimated distances, a position of the WTRU each of the plurality of beams; and estimate a WTRU's speed and direction of movement using the plurality of position estimates in combination with the times the respective beams were sent. The estimate of the distance from the network station to a WTRU is preferably made using at least one of an environmental factor, a cost-231 Hata model, a plane earth propagation model or a free space model.

DETAILED DESCRIPTION OF THE PREFERRED EMBODIMENT

Figure 1A:
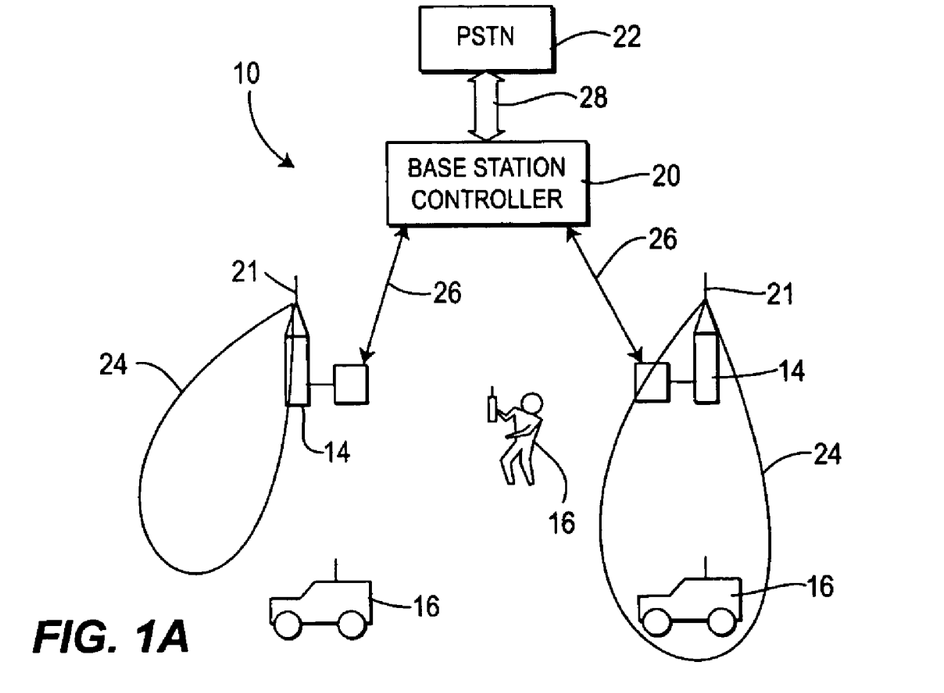
FIG. 1A is a diagram of a communication system in accordance with the teachings of which incorporates the present invention.

The present invention will be described with reference to the drawing figures wherein like numerals represent like elements throughout. Referring to FIG. 1A, a communication network 10 generally comprises one or more primary stations 14, each of which is capable of wireless communication with a plurality of WTRUs 16. Each WTRU 16 communicates with either the closest primary station 14 or the primary station 14 which provides the strongest communication signal. WTRUs in general are well known in the art and are used as vehicle telephones or hand held cell phones. Generally such WTRUs are also known as mobile units. Primary stations are also known as base stations.

Figure 1B:
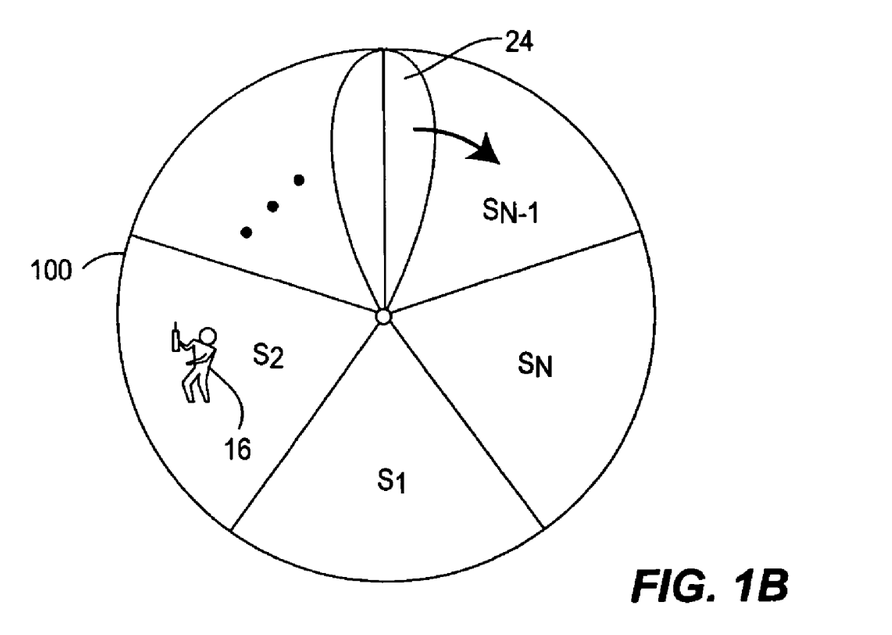
FIG. 1B is a diagram of a convergence area of a primary station of the system illustrated in FIG. 1A.

Each primary station 14 broadcast and receives signals through the coverage area 100 via the primary stations' antenna 21. The antenna 21, through its antenna array, shapes the antenna's radiation pattern into the form of a beam 24. The beam 24 is swept throughout a coverage area 100 as shown in FIG. 1B. The coverage area 100 comprises a plurality of sectors $S_1 \ldots S_N$. The base station controller 20 coordinates communications among multiple primary stations 14 by means of a network path 26 which may be a land line or wireless link. The communication network 10 may optionally be connected to a public switched telephone network (PSTN) 22 via a PSTN network path 28. Although the wireless communication system 10 is shown employing separate units for the network 26 and the primary stations 14, these functions may be physically combined with a base station 14 to form a "master primary station."

Figure 2:
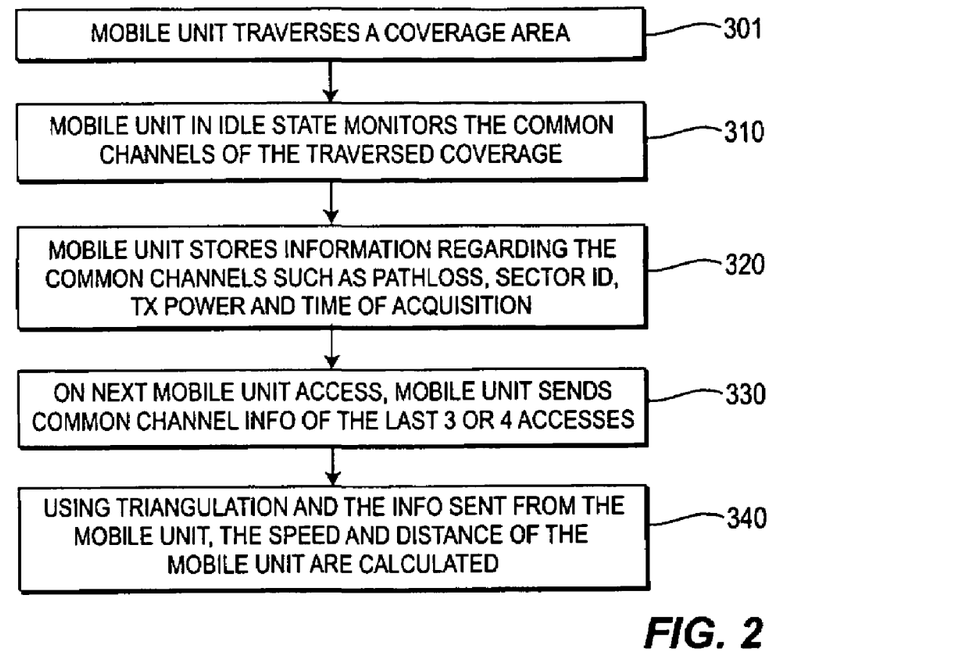
FIG. 2 is a flow diagram of a method for determining speed and distance of a WTRU in accordance with the teachings of the present invention.

With reference to FIG. 1A. and FIG. 2, a WTRU 16 traverses (step 301) through one or more sectors of the coverage area 100 of a primary stations 14, which is swept by a beam 24. The WTRUs 16 are configured to monitor one or more common channels when in an idle state (step 310), for example, the beacon channel which is broadcast by a primary station 14 throughout of the coverage area 100. Common channels by design are meant to be received by all WTRUs within the coverage area. As the idle (turned-on, but not active in user information exchange) WTRU 16 stays stationary or moves about the coverage area, it will store information about and from the beacon channel (step 320). This information may include the time, signal path loss, sector ID, beacon transmit power, received power and received interference level. The WTRU 16 later uplinks the information it has collected from the common channel to the primary stations 14 (step 330). The information will then be used by the network to determine the speed, distance and direction of the mobile (step 340).

When the WTRU 16 acquires a common channel, the common channel may also contain information from the primary station 14 that will assist the base station controller 20 determine the WTRU's location. For example, the network 20 will instruct the primary stations 14 to systematically sweep the beam 24 in a deterministic fashion throughout the coverage area to carve out sectors (see FIG. 1B). The base station controller 20 can append the common channels with a sector ID or beam number which indicates the sector the beam is transmitting in. The WTRU 16 later uplinks the time stamped information to the base station controller 20. The base station controller 20 can then use the sector id or beam number received by the WTRU 16 along with the calculated path loss to calculate the location of the WTRU 16 relative to the primary station 14. The pathloss is based upon the transmission power of the primary station 14 and the received power at the WTRU 16. An appropriate environmental model is then applied to compensate for the effects of the terrain. For example, if the environment were rural, then the base station controller would use a rural environment model in its calculations.

Figure 3:
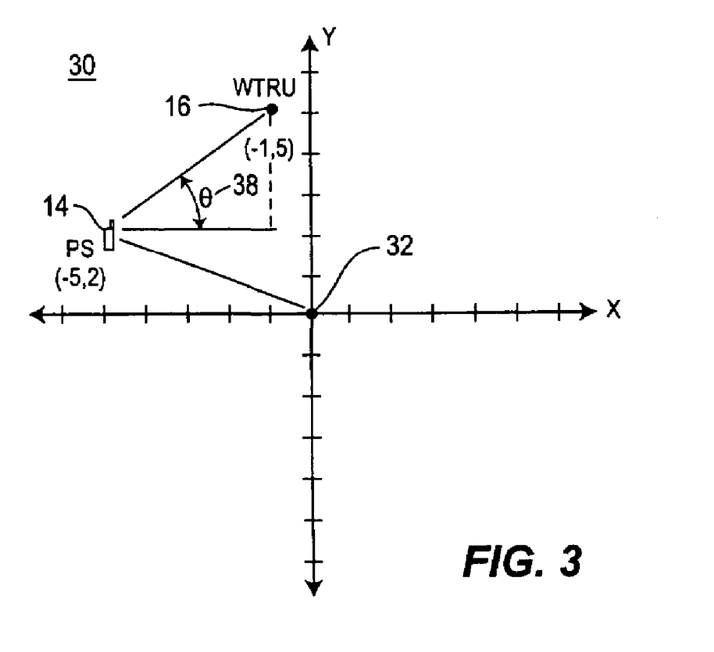
FIG. 3 is an example of the WTRU Cartesian coordinate representation of the coverage area is illustrated in FIG. 1B.

The position of the primary station is known and the network can translate the relative position into an absolute position. It should be noted that the position of the primary station is not an absolute position, it is a relative value to a known reference point using an X,Y grid or Cartesian coordinate system. The X axis represents the east and west direction and the Y axis represent the north and south direction. The grid values are usually in meters or kilometers. An example of the WTRU Cartesian coordinate representation for a coverage area is illustrated in FIG. 3.

To locate the position of a WTRU (WTRU_X, WTRU_Y), the $\Delta X$ and $\Delta Y$ distances are first determined as the X and Y distance from the primary station and the WTRU. The WTRU_X of the WTRU's position can be found in Equation 1:

$$WTRU\_X = \Delta X + PS\_position\_X; \qquad \text{Equation 1}$$

where $\Delta X$ is the X distance from WTRU to the PS and PS_position_X is the X coordinate of the PS. The WTRU_Y of the WTRU position can be found by Equation 2:

$$WTRU\_Y = \Delta Y + PS\_position\_Y \qquad \text{Equation 2}$$

where $\Delta Y$ is the Y distance form WTRU to the PS and PS_position_Y is the Y coordinate of the PS.

The distance from the Primary Station to the WTRU can be found from Equation 3:

$$\text{Distance\_TO\_WTRU} = \sqrt{(\Delta X^2) + (\Delta Y^2)}; \qquad \text{Equation 3}$$

where $\Delta X$ and $\Delta Y$ are the values from above equations. The azimuth angle from the PS to the WTRU can be found from Equation 4:

$$\text{Azimuth}(WTRU) = \tan^{-1}(\Delta Y/\Delta X) \qquad \text{Equation 4}$$

where Azimuth is the azimuth angle in degrees.

Referring to FIG. 3, a exemplary coverage area 30, is referenced by a Cartesian coordinate system with the reference point (RP) 32 located at the origin (0,0). A PS 14 is located at coordinates (−5,2) and a WTRU 16 is located at (−1,5). The azimuth angle $\Phi 38$ is the angle from the PS 14 to the WTRU 16. To calculate the distance from the PS 14 to the WTRU 16, the $\Delta X$ and $\Delta Y$ values must be obtained. The $\Delta X$ and $\Delta Y$ values are the X and Y distances from the PS 14 to the WTRU 16, respectively, which were obtained from calculations using pathloss and known PS transmit power and received power at the WTRU 16. The $\Delta X$ is equal to 4 and the $\Delta Y$ is equal to 3. Equation 3 is the used to determine that the distance from PS to WTRU 16, which is 5 meters. The azimuth angle $\Phi 38$ is determined from Equation 4 which is approximately 39 degrees.

The distance calculation is dependent upon the pathloss calculation and environmental variables, such atmospheric conditions. A typical propagation in free space model for determining the distance based on the pathloss and environment is shown in Equation 5:

$$\text{Distance} = 10^{(pathloss + 32.4 - 20 \log(f)/20)}; \qquad \text{Equation 5}$$

where f is the center carrier frequency in MHz; distance is in Km and the pathloss is in dB. Another method to calculate distance is the plane earth propagation model, which is illustrated by Equation 6:

$$\text{Distance} = 10^{(Pathloss+20\ log(HbHm)/40)};\quad \text{Equation 6}$$

where Hb is the height of the base station antenna (meters); Hm is height of mobile station antenna (meters) and the distance is in meters. In yet another method to calculate distance is the cost-231 Hata model for pathloss calculation is illustrated by Equations 7:

$$\text{Pathloss} = 46.3 + 33.9\ log(f) - 13.82\ log\ (Hb) - a(Hm) + (44.9 - (6.55\ log\ (Hb)))*log(\text{distance}) + Cm;\quad \text{Equation 7}$$

and for distance, Equation 8:

$$\text{Distance} = 10^{(Pathloss-46.3-33.9\ log(f)+13.82\ log\ (Hb)-a(Hm)-Cm/(44.9-6.55\ log(Hb)))};\quad \text{Equation 8}$$

where Hb and Hm are the base station's and the WTRU's antenna heights in meters; f is the center frequency in MHz; the distance is in Km; a is a correction factor in dB for the antenna height of the mobile for a medium small urban city and is illustrated in Equation 9:

$$(Hm) = (1.1\ log\ f - 0.7)Hm - 1.56\ log\ f + 0.8;\quad \text{Equation 9}$$

where the value of Cm changes depending on suburban or rural environments. For the suburban environmental model the Cm value is 0 dB and for the metropolitan environmental model, a 3 dB value is used.

As the WTRU moves about the coverage area, the network 20 can then calculate the speed and direction of the WTRU 16 by comparing WTRU's 16 beam 24 acquisition measurements. For example, to obtain an approximate speed determination, a simple equation such as the change in position divided by the change in time is shown in Equation 10:

$$\text{speed} = \Delta\ \text{position}/\Delta\text{time};\quad \text{Equation 10}$$

where Δ position is change in position and Δtime is the change in time.

A further breakdown of Equation 1 is illustrated by Equation 11:

$$\text{speed} = (P_n - P_{n-1})/(T_n - T_{n-1});\quad \text{Equation 11}$$

where $P_n$ and $T_n$ represent the current position and the current time of the WTRU 16 and $P_{n-1}$ and $T_{n-1}$ represent a previous position and its associated time.

It should be noted that the estimate of speed depends on the accuracy of the position estimates. The position estimates may become inaccurate if the coverage area 100 is large or if the WTRU 16 is near the furthermost perimeter of the cell. However, if the coverage area 100 is relatively small and the WTRU 16 is close to the center of the cell, the estimate will be highly accurate. The size of the sector will also impact the position estimate; more sectors will slice the coverage area into more positional determinable locations.

To obtain the direction of the WTRU, the system may simply use the current and previous locations of the WTRU. First the distance is calculated using the equations above and in FIG. 3.

In order to achieve the most efficient assignment of resources, it is highly desirable to produce an estimate of the position and speed of the WTRU 16 when it first comes into the coverage area 100. This allows the communication network 10 to employ admission algorithms and efficiently assign communication resources.

In another embodiment, the communications system may utilize neighboring primary stations or neighboring cells to more accurately estimate the position of a WTRU 16. When the WTRU 16 accesses a primary station 14, the communications may be monitored up by neighboring primary stations which also use adaptive antenna receivers. The linked receiving primary stations are then able to determine the location of the WTRU 16 using simple triangulation techniques to more accurately calculate the WTRU's position.

In an alternative embodiment, three or more WTRU beacon measurements are taken by the WTRU and reported back to the communications system. This allows for better determination of the speed and the direction of the WTRU.

While the present invention has been described in terms of the preferred embodiment, other variations which are within the scope of the invention as outlined in the claims below will be apparent to those skilled in the art.

What is claimed is:

1. A method used by a network station for facilitating the determination of a position, speed and direction of movement of wireless transmit/receive units (WTRUs) within a wireless communication network that provides communication services in a geographic area of service via the network station, the method for the network station comprising:

periodically generating directional beams for providing communication services in sectors of the geographic area of service such that each beam provides service to a predefined sector whereby collectively the directional beams provide service to the entire geographic service area;

generating the directional beams such that each directional beam includes directional beam identifying information data that at least includes transmission sector identification information; and receiving a collected data set from a WTRU that received a plurality of at least three of the generated directional beams from the network station, where the collected data set includes beam identifying information data and WTRU received signal strength data with respect to each of the plurality of the at least three of the generated directional beams received by the WTRU whereby an estimate of location, speed and direction of movement of the WTRU can be derived from the received collected data set.

2. The method for a network station according to claim 1 wherein:

the periodically generating directional beams is performed such that the directional beam identifying information data for each beam includes the direction the beam is sent, the time the beam is sent and transmission power used to send the beam.

3. The method for a network station according to claim 1 further comprising:

receiving collected data sets from each of a plurality of WTRUs that each received a plurality of at least three of the generated directional beams from the network station where the collected data sets each include beam identifying information data and WTRU received signal strength data with respect to each of a plurality of at least three of the generated directional beams successively received by the respective WTRU; and calculating an estimate of location, speed and direction of movement of the plurality of WTRUs based on the collected data sets received from the plurality of WTRUs.

4. The method for a network station according to claim 3 wherein:
the periodically generating directional beams is performed such that the directional beam identifying information data for each beam includes the direction the beam is sent, the time the beam is sent and transmission power used to send the beam.

5. The method for a network station according to claim 3 wherein
the receiving collected data sets of beam identifying information data is performed such that the beam identifying information data for each beam includes a direction of the beam, a time the beam was sent and a transmit power of the beam; and
the calculating an estimate of location, speed and direction of movement of a WTRU is performed based on the data sets received from the WTRU related to a plurality of beams by calculating a signal pathloss from the beam identifying information data and received signal strength data, for each of the plurality of beams, estimating, from the calculated pathloss, a distance from the network station known transmission location to the WTRU for each of the plurality of beams, estimating, from the network station known transmission location and the respective estimated distances, a position of the WTRU each of the plurality of beams, and estimating the WTRU's speed and direction of movement using the plurality of position estimates in combination with the times the respective beams were sent.

6. The method for a network station according to claim 5 wherein:
the periodically generating directional beams is performed such that the directional beam identifying information data for each beam includes the direction the beam is sent, the time the beam is sent and transmission power used to send the beam.

7. A method for a wireless transmit/receive unit (WTRU) configured for use in a wireless communication network in which network stations transmit wireless communication signals in directional beams such that beams are from time to time transmitted to each area serviced by the respective network station, each beam including beam identifying information, the method for the WTRU comprising:
receiving directional beams including beam identifying information transmitted by a network station and measuring the strength of the received beams;
storing the beam identifying information and received signal strength for a plurality of beams;
transmitting to the network sets of collected beam identifying information data and received signal strength data for a plurality of beams; and
said storing and said transmitting sets of beam identifying information data and received signal strength data is performed with respect to a selected number, no less than three, of successively received beams.

8. A wireless communication network in which communication services for wireless transmit/receive units (WTRUs) is provided by network stations that transmit wireless communication signals in directional beams such that beams are from time to time transmitted to each area serviced by the respective network station, each beam including beam identifying information, the network comprising:
at least one network station having a transmitter configured to transmit wireless communication signals in directional beams from a known location such that beams are from time to time transmitted to each area serviced by the network station, each beam including beam identifying information;
at least one WTRU having a receiver configured to receive a plurality of network station transmitted directional beams, including beam identifying information for each of the received beams and to measure respective received signal strength for each of the plurality of beams received;
said at least one WTRU having a memory configured to store respective beam identifying information data with respective measured received signal strength data;
said at least one WTRU having a transmitter configured to transmit to the network station stored beam identifying information data and received signal strength data for the plurality of received beams; and
said memory of said at least one WTRU configured to store and said transmitter of said at least one WTRU configured to transmit sets of beam identifying information data and received signal strength data for a selected number, no less than three, of successively received beams.

9. A network according to claim 8 wherein said at least one network station includes:
a receiver configured to receive sets of beam identifying information data and received signal strength data from WTRUs; and
an associated controller configured to estimate the position, speed and direction of movement of a particular WTRU using beam identifying information data and received signal strength data for a plurality of received beams received from the particular WTRU in a data set.

10. The network according to claim 9 wherein:
said memory of said at least one WTRU is configured to store beam identifying information data for each beam that includes a direction of the beam, a time the beam was sent and a transmit power of the beam; and
said controller of said at least one network station is configured to:
calculate a signal pathloss from the beam identifying information data and received signal strength data, for each of the plurality of beams;
estimate, from a calculated pathloss, a distance from the network station known transmission location to the WTRU for each of the plurality of beams;
estimate, from a network station known transmission location and respective estimated distances, a position of the WTRU each of the plurality of beams; and
estimate a WTRU's speed and direction of movement using the plurality of position estimates in combination with the times the respective beams were sent.

11. The network according to claim 10 wherein said controller of said at least one network station is configured to estimate the distance from the network station to a WTRU using one of: an environmental factor, a cost-231 Hata model, a plane earth propagation model or a free space model.

12. A network according to claim 8 wherein said at least one network station includes:
a receiver configured to receive from WTRUs receiving transmitted directional beams from the network station collected data sets with respect to a predetermined number, not less than three, of network station transmitted beams including beam identifying information data and WTRU received signal strength data from which an estimate of location, speed and direction of movement of the respective WTRU can be derived.

13. A network according to claim 9 wherein said transmitter of said at least one network station is configured to generate the directional beams such the directional beam identifying information data for each beam includes the direction the beam is sent, the time the beam is sent and transmission power used to send the beam.

14. A network according to claim 12 wherein said at least one network station includes a controller operatively associated with the receiver of said at least one network station and configured to calculate an estimate of location, speed and direction of movement of WTRUs based on the data sets received from WTRUs receiving transmitted directional beams from the network station.

15. A network according to claim 14 wherein said transmitter of said at least one network station is configured to generate the directional beams such the directional beam identifying information data for each beam includes the direction the beam is sent, the time the beam is sent and transmission power used to send the beam.

16. A network according to claim 14 wherein said receiver of said at least one network station is configured to receive data sets of beam identifying information data where the beam identifying information data for each beam includes a direction of the beam, a time the beam was sent and a transmit power of the beam; and the controller is configured to calculate an estimate of location, speed and direction of movement of a WTRU based on the data sets received from the WTRU related to a plurality of beams by calculating a signal pathloss from the beam identifying information data and received signal strength data, for each of the plurality of beams, estimating, from the calculated pathloss, a distance from the network station known transmission location to the WTRU for each of the plurality of beams, estimating, from the network station known transmission location and the respective estimated distances, a position of the WTRU each of the plurality of beams, and estimating the WTRU's speed and direction of movement using the plurality of position estimates in combination with the times the respective beams were sent.

17. A network according to claim 16 wherein said transmitter of said at least one network station is configured to generate the directional beams such the directional beam identifying information data for each beam includes the direction the beam is sent, the time the beam is sent and transmission power used to send the beam.

* * * * *

UNITED STATES PATENT AND TRADEMARK OFFICE
CERTIFICATE OF CORRECTION

PATENT NO. : 7,248,883 B2
APPLICATION NO. : 11/261238
DATED : July 24, 2007
INVENTOR(S) : Angelo Cuffaro It is certified that error appears in the above-identified patent and that said Letters Patent is hereby corrected as shown below:

At column 1, line 19, after the words "speed and", delete "distance" and insert therefor --position--.

At column 2, line 41, before the word "known", delete "station" and insert therefor --station's--.

At column 2, line 44, before the word "known", delete "station" and insert therefor --station's--.

At column 2, line 67, before the word "illustrated", delete "is" and insert therefor --as--.

At column 3, line 16, before the words "and receives", delete "broadcast" and insert therefor --broadcasts--.

At column 3, line 54, before "20 determine", insert --to--.

At column 4, line 29, after the word "distance", delete "form" and insert therefor --from--.

At column 4, line 57, before the word "used", delete "the".

At column 4, line 58, after the word "determine", delete "that".

At column 4, line 62, before the word "atmospheric", insert --as--.

At column 4, line 67, delete Equation 5, and insert therefor
--$Distance = 10^{(Pathloss - 32.4 - 20 \log(f))/20}$--.

UNITED STATES PATENT AND TRADEMARK OFFICE
CERTIFICATE OF CORRECTION

PATENT NO. : 7,248,883 B2
APPLICATION NO. : 11/261238
DATED : July 24, 2007
INVENTOR(S) : Angelo Cuffaro It is certified that error appears in the above-identified patent and that said Letters Patent is hereby corrected as shown below:

At claim 10, column 8, line 50, after the word "network", delete "station", and insert therefor --station's--.

At claim 10, column 8, line 54, before the words "each of", insert --related to--.

At claim 13, column 9, line 9, after the word "such", insert --that--.

At claim 15, column 9, line 22, after the word "such", insert --that--.

At claim 16, column 10, line 11, after the word "network", delete "station", and insert therefor --station's--.

At claim 16, column 10, line 13, after the word "network", delete "station", and insert therefor --station's--.

At claim 17, column 10, line 23, after the word "such", insert --that--.

Signed and Sealed this

Seventeenth Day of June, 2008

JON W. DUDAS
*Director of the United States Patent and Trademark Office*